United States Patent [19]

Mathers et al.

[11] Patent Number: 4,855,264
[45] Date of Patent: Aug. 8, 1989

[54] ALUMINUM OXIDE/ALUMINUM OXYNITRIDE/GROUP IVB METAL NITRIDE ABRASIVE PARTICLES DERIVED FROM A SOL-GEL PROCESS

[75] Inventors: James P. Mathers, Woodbury; William P. Wood, Minneapolis; Thomas Forester, St. Paul, all of Minn.

[73] Assignee: Minnesota Mining and Manufacturing Company, St. Paul, Minn.

[21] Appl. No.: 183,478

[22] Filed: Apr. 15, 1988

Related U.S. Application Data

[63] Continuation of Ser. No. 932,941, Nov. 20, 1986.

[51] Int. Cl.$^4$ .................. C04B 35/58; C09C 1/68; C09K 3/14
[52] U.S. Cl. .................. 501/98; 501/127; 501/134; 501/153; 51/307
[58] Field of Search .................. 501/98 A–98 D, 501/102, 127, 153, 96, 134; 51/307

[56] References Cited

U.S. PATENT DOCUMENTS

| Re. 32,111 | 4/1986 | Lambert et al. ............... 428/698 |
|---|---|---|
| 2,929,126 | 3/1960 | Bollack et al. ............... 501/98 |
| 3,108,887 | 10/1963 | Lenie et al. ............... 501/98 |
| 3,171,715 | 3/1965 | Kleinsteuber ............... 23/14.5 |
| 3,331,783 | 7/1967 | Braun et al. ............... 252/301.1 |
| 3,487,594 | 1/1970 | Murata ............... 501/98 |
| 3,565,643 | 2/1971 | Bergna ............... 501/98 |
| 3,652,304 | 3/1972 | Daniels ............... 106/57 |
| 3,676,161 | 7/1972 | Yates ............... 501/98 |
| 3,860,691 | 1/1975 | Gens ............... 423/254 |
| 3,904,736 | 9/1975 | Triggiani ............... 423/251 |
| 4,022,584 | 5/1977 | Rudy ............... 228/122 |
| 4,203,733 | 5/1980 | Tanaka et al. ............... 501/153 |
| 4,204,873 | 5/1980 | Yamamoto et al. ............... 106/43 |
| 4,241,000 | 12/1980 | McCauley ............... 264/65 |
| 4,249,914 | 2/1981 | Ogawa et al. ............... 51/309 |
| 4,314,827 | 2/1982 | Leitheiser et al. ............... 51/298 |
| 4,320,203 | 3/1982 | Brandt et al. ............... 501/87 |
| 4,325,710 | 4/1982 | Tanada et al. ............... 51/309 |
| 4,366,254 | 12/1982 | Rich et al. ............... 501/89 |
| 4,481,300 | 11/1984 | Hartnett et al. ............... 501/98 |
| 4,563,433 | 1/1986 | Yeckley et al. ............... 501/97 |
| 4,599,281 | 7/1986 | Schintlmeister et al. ............... 428/698 |

FOREIGN PATENT DOCUMENTS

| 26750 | 4/1981 | European Pat. Off. . | |
|---|---|---|---|
| 69706 | 2/1982 | European Pat. Off. . | |
| 0107571 | 11/1983 | European Pat. Off. . | |
| 115745 | 8/1984 | European Pat. Off. . | |
| 55-126567 | 9/1980 | Japan ............... | 501/98 |
| 55-154372 | 12/1980 | Japan ............... | 501/98 |
| 60-191061 | 9/1985 | Japan ............... | 501/98 |
| 61-117162 | 6/1986 | Japan ............... | 501/98 |
| 719885 | 2/1963 | United Kingdom ............... | 501/98 |

OTHER PUBLICATIONS

Chemical Abstracts 102(8): 66208e.
*Kirk-Othmer Encyclopedia of Chemical Technology*, John Wiley & Sons, NY (1978), p. 26–52.
Launay, "Chemical Abstracts", vol. 104 (1986), #234626.
Chemical Abstracts 99(6): 42277v, 108(6): 42848m.
Abstract of "Hot-pressing Synthesis of an Al$_2$O$_3$–Alon Composite", Goeuriot, et al., in *Science of Ceramics* 14 ISBN: 0-901092-41-X.

*Primary Examiner*—William R. Dixon, Jr.
*Assistant Examiner*—Andrew Griffis
*Attorney, Agent, or Firm*—Donald M. Sell; Walter N. Kirn; Lorraine R. Sherman

[57] ABSTRACT

The present invention provides a nearly fully dense, microcrystalline, composite ceramic abrasive particle comprising grains of alumina, gamma-aluminum oxynitride and, optionally, a Periodic Group IVB metal nitride in the system Al$_2$O$_3$/ALON/Group IVB metal nitride. In another aspect, two different processes for making an abrasive particle such as an abrasive grit, comprising a multiphase mixture of microcrystalline components in this system using sol gel techniques and pressureless reaction-sintering, are disclosed.

7 Claims, No Drawings

ALUMINUM OXIDE/ALUMINUM OXYNITRIDE/GROUP IVB METAL NITRIDE ABRASIVE PARTICLES DERIVED FROM A SOL-GEL PROCESS

This is a continuation of application Ser. No. 06/932,941 filed Nov. 20, 1986 abandoned.

FIELD OF THE INVENTION

The present invention relates to ceramic abrasive particles in an aluminum oxide/gamma-aluminum oxynitride/periodic Group IVB metal nitride system. In another aspect, a method for the preparation of ceramic abrasive particles by a sol-gel process is disclosed. In yet another aspect, a method for grinding a surface using the ceramic abrasive particle of the invention is disclosed.

BACKGROUND OF THE INVENTION

Aluminum oxide, gamma-aluminum oxynitride (ALON), and TiN are well known ceramics for applications such as electronic substrates, optical windows, and crucibles. $Al_2O_3$ has been used for abrasive grit as well. ALON has been disclosed in U.S. Pat. No. 4,241,000 as an abrasive grit.

The mechanical properties of ceramic materials have been improved in recent years as a better understanding has been gained as to the effects of processing on the final microstructure. It is well known that low levels of porosity and a fine grain size are required for optimal mechanical performance. Microstructures containing both of these characteristics are not readily obtained because as temperatures are increased to promote the elimination of pores during sintering, grain growth is also accelerated. One technique used to overcome this difficulty has been the combination of different crystalline components to form a composite material.

European Pat. No. 0,107,571 (French counterpart No. 821,957 and English language abstract) describes composite ceramics of $Al_2O_3$ and ALON which are useful as cutting tools, dies, crucibles, etc. The mechanical properties compared with prior art alumina are said to be improved.

Composites of TiN and $Al_2O_3$ have been disclosed in U.S. Pat. Nos. 3,652,304; 4,022,584; 4,204,873; 4,249,914; 4,325,710; 4,366,254; and JP No. 50-89410 (abstract); JP No. 57-16954 (abstract). The utility disclosed is primarily as cutting tools, but in one case as crucibles. In some of these patents additional components were added to modify the performance or sintering behavior.

Composite cutting tools of TiN with $Al_2O_3$ and ALON are disclosed in U.S. Pat. No. 4,320,203.

The background art in the $Al_2O_3$/ALON/TiN system is product oriented to relatively large shapes and forms, for example cutting tools, electronic substrates and crucibles, rather than small particulate products such as abrasive grit. The prior art methods of production employ ceramic powders which are pressed or otherwise shaped to the desired form, and then sintered or reaction-sintered to densify. The manufacture of individual abrasive grit by these techniques is impractical due to the size and numbers required. Also, crushing and screening of larger articles to the desired size range is impractical because of the strength and toughness of these materials. Another problem with the prior art process is the high cost of sinterable AlN and TiN powders used in these processes. For example, commercial AlN powders (which are used to form ALON by reaction with $Al_2O_3$) typically cost $55–65/kg, and cannot be sintered without extensive milling and size classification. Powders which are readily sinterable may cost as much as $325/kg.

It is known in the patent literature and technical publications to use sol-gel processes for the preparation of spherical, nuclear fuel particles of the carbides and nitrides of uranium and thorium. Typically hydrous sols of uranium oxide and thorium oxide were co-dispersed with carbon, formed into spheres, then gelled and reaction-sintered to form a carbide or nitride sphere. Examples of this teaching include U.S. Pat. Nos. 3,171,715; 3,331,783; 3,860,691; and 3,904,736. The final products were typically less than 95% dense.

The preparation of abrasives comprising alumina and other metal oxides by a sol-gel process is disclosed in U.S. Pat. No. 4,314,827.

The use of sol-gel processes to prepare particles from mixed sols of alumina/carbon, alumina/titania/carbon, or alumina/nitrides, followed by dehydration and reaction-sintering to form dense ceramics in the $Al_2O_3$/ALON/TiN system is believed not disclosed in the literature. It is believed to be novel in the art to use materials in the system $Al_2O_3$/ALON/TiN as abrasives.

SUMMARY OF THE INVENTION

Briefly, the present invention provides a nearly fully dense, microcrystalline, composite ceramic abrasive particle comprising grains of alumina, gamma-aluminum oxynitride and, optionally, a Periodic Group IVB metal nitride in the system $Al_2O_3$/ALON/Group IVB metal nitride. In another aspect, two different processes for making an abrasive particle such as an abrasive grit, comprising a multiphase mixture of microcrystalline components in this system using sol-gel techniques and pressureless reaction-sintering, are disclosed.

In a further aspect, a method of grinding a surface using an abrasive particle of the present invention is disclosed.

The particles of the invention are polycrystalline composites containing grains of $Al_2O_3$ and ALON and optionally grains of at least one Periodic Group IVB metal nitride which preferably is titanium nitride. These grains are sintered together and uniformly distributed throughout the composite. The composite materials are nearly fully dense with less than 4 volume percent pores. The maximum grain size is less than 10 micrometers and, more typically, less than 5 micrometers. The materials are useful, for example, as abrasive particles.

To prepare the ceramics in the preferred $Al_2O_3$, ALON, TiN system of the invention by a sol-gel process, carbon and $TiO_2$ are dispersed in an alumina sol, formed into the desired shape, gelled, dried and reaction-sintered to form a dense ceramic in the $Al_2O_3$/ALON/TiN system. ALON is formed by a reaction between alumina, carbon, and nitrogen from the furnace atmosphere. TiN is formed by a similar reaction between $TiO_2$, carbon, and nitrogen. The proportions of $Al_2O_3$, ALON, and TiN in the final composite are determined by the relative amounts of alumina, $TiO_2$, and carbon used to formulate the sol.

Alternatively, AlN and TiN can be dispersed into the alumina sol. After gelling, drying, and reaction-sintering, dense ceramic particles in the $Al_2O_3$/ALON/TiN system are obtained. In this case, ALON forms by a reaction between the $Al_2O_3$ and AlN.

In this Application:

"ceramic" means an inorganic material composed of both metallic and nonmetallic elements, e.g. oxides, nitrides, carbides;

"solid solution" means a single crystalline phase which may be varied in composition within finite limits without the appearance of an additional phase;

"ALON" means an acronym which represents gamma-aluminum oxynitride, a solid solution formed between $Al_2O_3$, and AlN according to the equation:

$$Al_2O_3 + xAlN \rightarrow Al_{(2+x)}O_3N_x \quad \text{Eq. 1}$$

There is substantial disagreement in the literature on the composition range for this material, but a generally accepted range would be 20-40 mole percent AlN, i.e. $x = 0.25-0.87$ in equation 1. ALON has a cubic, spinel type of crystal structure as opposed to the hexagonal structure of alpha-$Al_2O_3$. Thus, in the past it has sometimes been referred to as nitrogen stabilized cubic $Al_2O_3$ or nitrogen containing aluminum oxide. It is now more commonly known by the acronym ALON;

"abrasive particle" means a small particle (grit, flake, rod, or other shape) having an average maximum dimension of 10 mm or less, preferably 5 mm or less, and capable of abrading a surface, e.g. metals, ceramics, glass, or plastics;

"grain" means an individual crystal which together with other grains (crystals) make up a polycrystalline ceramic particle, for example an abrasive grit, or flake;

"composite" means a polycrystalline ceramic particle composed of two or more separate phases representative of two or more different types of grains (crystals);

"sol" means a colloidal suspension of a solid phase in a liquid medium having an average particle size below 0.1 micrometer;

"gel" means a 3-dimensional solid network containing a large volume of interconnecting pores filled with a liquid;

"sol-gel processing" means using a sol as one of the principal starting materials and at some point gelling the sol by means of chemical additives or dehydration to obtain a shaped article; and "conventional powder processing" means a process utilizing powders as starting materials, typically with an average particle size in the range of 0.1 to 5 micrometers and shaping these into an article using such well known techniques as dry-pressing, slip-casting, injection molding, isostatic pressing, hot-pressing, etc.

Compositions and abrasive articles in the system AlN/ALON/TiN which are derived from a sol-gel process are disclosed in assignee's copending patent application Ser. No. 06/933014 (now U.S. Pat. No. 4,788,167) filed the same date as this application.

DETAILED DESCRIPTION OF THE INVENTION

The present invention provides an abrasive ceramic particle which is a uniform multiphase composite comprising:

1 to 95, preferably 1 to 85, and most preferably 1 to 70, volume percent aluminum oxide, 1 to 95, preferably 15 to 85 volume percent gamma-aluminum oxynitride 0 to 50, preferably 0 to 35, and most preferably 15 to 35, volume percent of at least one of Periodic Group IVB metal nitrides (preferably titanium nitride).

The present invention provides alternative methods for preparing abrasive particles.

Method I for preparing an abrasive ceramic particle comprises the steps of:

(a) preparing a mixed sol comprising an alumina precursor which preferably is aluminum monohydrate, carbon or chemical precursor thereof, optionally at least one of a Periodic Group IVB metal oxide, which preferably is titanium dioxide, or chemical precursors thereof, optionally glycerol or other carbon stabilizing agent, and an alpha-alumina seeding agent, the components being present in proportions sufficient to provide a ceramic abrasive particle comprising (1) 1 to 99, preferably 1 to 85, and most preferably 1 to 70, volume percent aluminum oxide, (2) 1 to 99, preferably 15 to 85, volume percent aluminum oxynitride, and (3) 0 to 50 volume percent of at least one of Period Group IVB metal nitrides, preferably titanium nitride, (b) gelling said mixed sol, (c) drying said resulting gelled sol to provide granules, (d) optionally, crushing and sieving said granules to provide sized granules, (e) calcining said granules at a temperature in the range of about 600°-1200° C. in a nitrogen atmosphere to remove volatile constituents.

(f) reaction-sintering said calcined granules at a temperature above 1600° C. to provide the ceramic abrasive particle.

To prepare a preferred abrasive particle of the invention in accordance with Method I a mixed sol comprising sources of alumina, carbon, and optionally $TiO_2$ is formed into the desired shape, e.g. abrasive grit, by sol-gel techniques, and heated in a $N_2$ atmosphere. During the heat-treatment cycle (e.g., at temperatures in the range of 600° to 1200° C.), fugitives or volatiles are removed. The reaction to form AlON proceeds with subsequent sintering at higher temperatures to produce a highly dense article. The first stage of reaction is:

$$Al_2O_3 + 3C + N_2 \xrightarrow{1400° C.} 2AlN + 3CO \quad \text{Eq. 2}$$

The amount of carbon added to the sol determines the amount of $Al_2O_3$ which will be converted into AlN according to Eq. 2. At higher temperatures (e.g., 1600°-1900° C.) the AlN and some of the residue $Al_2O_3$ react to form ALON:

$$Al_2O_3 + xAlN \rightarrow Al_{(2+x)}O_3N_x \quad \text{Eq. 3}$$

The amount of carbon determines the relative proportions of AlN and $Al_2O_3$ formed in the early stages of the reaction, and this in turn determines the relative amounts of $Al_2O_3$ and ALON in the final composite. If the carbon content in the initial sol is high enough, sufficient AlN can be formed to convert all the $Al_2O_3$ to ALON. At even higher carbon content the amount of AlN formed by Eq. 2 will be such that excess AlN will be present following the reaction of Eq. 3. In that case composites in the system AlN/ALON will be formed (see copending patent application Ser. No. 06/933014 (now U.S. Pat. No. 4,788,167) (attorney's docket No.

F.N. 41781 USA 1A), filed the same date as this application.

If the precursor sol contains a source of TiO$_2$, along with additional carbon, then an additional reaction occurs to produce TiN as well:

$$TiO_2 + 2C + 0.5N_2 \rightarrow TiN + 2CO \qquad \text{Eq. 4}$$

Other oxides from Group IVB of the periodic table, for example zirconia, when present will be converted to their respective nitrides:

$$ZrO_2 + 2C + \tfrac{1}{2}N_2 \rightarrow ZrN + 2CO \qquad \text{Eq. 5}$$

Composites in the system Al$_2$O$_3$/ALON/ZrN, or the system Al$_2$O$_3$/ALON/HfN can also be prepared by the process of the invention.

Preparation of the sol:

The alumina precursor sol may be prepared from an aluminum monohydrate powder. A preferred source is the aluminum monohydrate prepared by hydrolyzing aluminum isopropoxide and is available from Chattem Chemicals, Chattanooga, Tenn., U.S.A. The alumina precursor powder is dispersed in 80° C. deionized water acidified with nitric acid as a peptizing agent. The sols typically contain about 15 weight percent Al$_2$O$_3$ solids after calcining to 1000° C. Carbon black and other oxides, when used, may be dispersed into the alumina sol by ball-milling for about 48 hours. A preferred source of carbon black is Monarch TM 1300, Cabot Corporation, Glen Ellyn, Ill. A preferred source of TiO$_2$ is fumed TiO$_2$ (P-25 TM, Degussa Corporation, Teterboro, N.J). It will be recognized that various chemical precursors can be used as sources of these materials. Numerous water soluble organics which decompose on heating in N$_2$ to form carbon can serve as a source of carbon, e.g. polyvinyl alcohol, polyvinylpyrrolidone, and sucrose. TiO$_2$ can be formed by the controlled hydrolysis of TiCl$_4$ in the aqueous alumina sol.

In the preparation of the carbon-containing sols, certain critical requirements need to be observed. First the carbon black should be dispersed so that the largest aggregates or agglomerates are less than about 1 micrometer in size. The bulk of the carbon must be dispersed on a much finer scale. Ball-milling is an effective procedure to achieve such dispersions; however, careful attention must be given to impurities introduced from wear of the milling media and ball jar.

During the later heat-treating stages of the process the aluminum monohydrate present in the original sol will undergo a sequence of crystallographic phase transformations, forming different so-called transition crystal structures before arriving at the stable high temperature alpha-alumina structure. It is important that the sol contain a small fraction of alpha-alumina crystals to nucleate or seed the final transformation to the alpha structure. If these are not present the alpha-Al$_2$O$_3$ will form a vermicular, porous microstructure which is difficult to sinter to full density. Seeding causes the alpha-Al$_2$O$_3$ to form a microstructure consisting of roughly equiaxed grains and pores which is more readily sintered to full density. M. Kumagai and G. L. Messing describe this phenomena more fully (see J. Am. Ceram. Soc. 68(9) 500–505 (1985)).

A convenient means for seeding the sol is to mill it with a grinding media composed of alpha-alumina (for example, Burundum TM, Norton Company, Worcester, Mass.). The quantity of alpha-alumina nucleating seeds which are obtained from the wear of the Burundum milling media must be limited. When carbon black was milled directly into the sol formulation with Burundum media, numerous pores 5–10 micrometers in size were observed in the final product. The porosity was eliminated by reducing the seed concentration in the sol. It was not determined if the elimination of porosity was due to the quantity of nucleating seed, or if it was related to silica and/or other impurities in the media.

In formulations with limited amounts of carbon, the concentration of seeds can be reduced by milling a more concentrated carbon/alumina sol and then diluting the milled sol back to the desired formulation with additional alumina sol. However, the concentration of carbon which can be milled is limited to about 4 weight percent, otherwise the sol becomes too viscous to obtain a good dispersion. In the formulations requiring higher amounts of carbon, the dilution factor was insufficient to lower the seed concentration to a satisfactory level. Attempts to use a high purity alumina media to disperse the carbon were not successful as this type of media showed excessive wear. This loaded the sol with a large quantity of 1–2 micrometer crystals of Al$_2$O$_3$ and also shifted the Al$_2$O$_3$ content of the sol in an unpredictable manner, in one instance more than doubling the Al$_2$O$_3$ content of the sol.

A preferred procedure is to pre-mill a portion of the alumina sol without any carbon black and using the Burundum media. This seeded sol is added to an alumina/carbon sol which was milled with a high purity zirconia media to disperse the carbon and any other metal oxides which may have been added to the sol. In this way the concentration of seeds can be maintained at an optimal level regardless of the carbon content of the formulation. The zirconia contaminants introduced by milling with zirconia media resulted in a small amount (i.e., less than 3 volume percent) of dispersed ZrN in the microstructure, the carbothermal reduction product of the zirconia impurities.

When a second oxide is added to the alumina/carbon sol to create a secondary nitride phase, it is important to ensure that the oxide is compatible with the alumina sol. For example, both the alumina and titania powders utilized in the illustrative examples formed stable sols at a pH of 3.5. However, when they were combined, large chainlike flocs formed in the sol when it was allowed to stand undisturbed. In this particular case stirring the sol during gelation readily broke-up these flocs and prevented reagglomeration.

Gelation of the Sol:

The sol can be gelled simply by the loss of water during drying. Temperatures between about 20° and 90° C. are satisfactory. It is desirable to stir the gel either occasionally or at regular intervals to maintain a uniform mixture of components.

It is preferable, however, to gel the sol prior drying to insure that a uniform distribution of the dispersed ingredients is maintained. A convenient means of gelling the sol is the addition of an aqueous solution of aluminum nitrate. For example, the addition of a 25 weight percent solution of aluminum nitrate in water in an amount equal to 4 weight percent of the alumina sol has been found to gel a sol with an Al$_2$O$_3$ content of 15 weight percent, typically in 5 to 15 minutes. Other well known means of gelling alumina sols may also be used, see, for example, J. L. Woodhead, J. Mater. Educ. 6(9) 887–925 (1984). Generally these involve altering the pH or ionic content of the sol.

Since the carbon content of the gel determines the extent of nitride formation during reaction-sintering it is important to control the carbon content to arrive at the desired final composition. During calcining of the gel, the temperature and conditions are sufficient to promote the reaction between water vapor and carbon:

$$H_2O + C \rightarrow CO + H_2. \qquad \text{Eq. 6}$$

This reaction can reduce the carbon content by as much as 30 weight percent. The addition of small amounts of water soluble organic additives such as glycerol to the sol before gellation has been found to stabilize the carbon content during calcination of the dried gel.

It was discovered that sols which were gelled with ammonium acetate rather than aluminum nitrate were not plagued with loss of carbon after calcining. However, ammonium acetate causes sols prepared from Chattem alumina to gel in a rapid, uncontrolled fashion with the formation of large flocs. The ammonium nitrate gels the sol in a much more controlled fashion with a minimal amount of floc. Several different organic additives were evaluated with the objective of finding a water soluble organic which would not interfere with the gelation of the sol by aluminum nitrate and would stabilize the carbon content. Gelling and calcining experiments were conducted on several sols which had a carbon content of 5.9 weight percent. In each case the amount of organic added to the sol was equal to 5 weight percent of the expected solids content of the sol after calcining. Results for several organics appear in Table I, below. Of these, only ammonium acetate interfered with gelation.

TABLE I

| Carbon Content of Calcined Gels - by Analysis | | |
|---|---|---|
| 1. | control (no organic) | 5.0 wt % C |
| 2. | ammonium acetate | 5.9 |
| 3. | acetic acid | 5.3 |
| 4. | aluminum acetate | 5.2 |
| 5. | glycerol | 6.0 |

The data of Table I show that both ammonium acetate and glycerol were effective in preventing the oxidation of carbon (the accuracy of the analytical techniques used is believed to be ±0.1 weight percent). Acetic acid and aluminum acetate were less effective. The differences cannot be attributed to extra carbon derived from the pyrolysis of the organic additive. Measurements of the carbon residue in the same gels without carbon black showed a negligible amount of carbon (i.e., less than 0.1 weight percent).

If glycerol or another similar acting watersoluable organic is not added to the sol the carbon content must be raised to compensate for that which is latter lost in calcining.

Drying and Calcining the Gel:

The gel is allowed to open air dry for about 24 hours, and then further dried in a 90° C. oven to remove most of the free water. The gel will break-up during drying forming coarse granules ranging from about 2 to 15 mm in size. At this point the dry gel may be comminuted and graded, taking into account shrinkage which will occur later, so as to obtain the desired size in the final product. The remaining water and fugitive volatiles are then removed by calcination with slow heating up to 1000° C. under a nitrogen atmosphere.

Reaction-Sintering:

In the reaction-sintering process the carbon reacts with the alumina and other metal oxides which may be present to form the desired nitrides or oxynitrides. These nitrides densify in the later stages of the process. The reaction-sintering may be performed in a graphite element, nitrogen atmosphere furnace. The calcined gel particles are preferably reacted in a BN crucible with a series of holes 1 mm (0.040 in.) in diameter drilled in the bottom of the curcible to allow an unobstructed nitrogen flow. The nitrogen flow in the furnace is directed down through the bed of reactants and then is exhausted from the furnace sweeping away the CO reaction product. A suitable heating schedule was:

| | |
|---|---|
| room temp. → 1000° C. | about 15 min. |
| 1000 → 1400° C. | about 200° C./hr. |
| 1400 → 1900° C. | about 25° C./min. |
| 1900° C. | hold 2 hours |
| cool furnace | about 1.5 hours |

Method II for preparing an abrasive ceramic particle comprises the steps of (a) preparing a mixed sol comprising an alumina precursor, aluminum nitride powder, and optionally at least one of Period Group IVB metal nitrides, and an alpha-alumina seeding agent, the components being present in sufficient proportions to provide a ceramic abrasive particle comprising:

1 to 99, preferable 1 to 85, most preferably 1 to 70, volume percent gamma-aluminum oxide, 1 to 100, preferably 15 to 85, volume percent oxynitride, and 0 to 50, preferably 0 to 35, and most preferably to 35, volume percent of at least one of the Periodic Group IVB metal nitrides; preferably the Periodic Group IVB metal nitride is titanium nitride, (b) gelling said mixed sol, (c) drying said resulting gelled sol to provide granules, (d) optionally, crushing and sieving said granules to provide same-sized granules, (e) calcining said granules at a temperature of 600°-1200° C. in a nitrogen atmosphere to remove volatile constituents, (f) reaction sintering said calcined granules at a temperature above 1600° C., e.g. 1600°-2000° C., to provide the ceramic abrasive particle In this process the ALON component is formed by a reaction between the AlN and some of the $Al_2O_3$ at temperatures above 1600° C. The reaction is described by Eq. 3. It can be seen that the amount of AlN present determines how much of the $Al_2O_3$ is transformed into ALON.

If the amount of AlN exceeds that required to convert all of the $Al_2O_3$ to ALON, then free AlN will be present in addition to the ALON. In such a case, composites in the system AlN/ALON/TiN would be formed.

While dense compositions have been made in this manner, there are three limitations to this method:

1. The compositions which are obtainable are limited by the amount of AlN which can be incorporated into the alumina sol.

2. Since fine AlN powders are subject to hydrolysis, special precautions must be taken to limit this reaction. Precise composition control is difficult.

3. The high cost of AlN powder as a raw material makes this approach prohibitive for some applications.

An advantage to this method, however, compared to Method I, is that reaction with nitrogen from the furnace atmosphere is not required, and there is no carbon monoxide by product which must be removed. Transport of these gases into and out of the gell structure complicates the reaction-sintering process of Method I, generally requiring slower heating schedules.

When AlN is added directly to a sol, an important consideration is the hydrolysis of the AlN powder. In water, the AlN slowly hydrolyzes to form aluminum hydroxide and ammonium hydroxide.

$$AlN + 4H_2O \rightarrow Al(OH)_3 + NH_4OH \qquad \text{Eq. 7}$$

Normally, the reaction rate is decreased by a semi-protective layer of hydroxide formed at the surface of the AlN particle. However, if the AlN is milled into an aqueous sol to aid in dispersion, a fresh surface would be continually exposed to the water and hydrolysis could proceed quite rapidly. To minimize this problem, a preferred procedure is to first disperse the AlN into an organic water miscible solvent such as acetone. The well dispersed AlN/acetone sol is then mixed into the aqueous alumina sol, gelled and dried to form an abrasive grain. Following calcination to 1000° C. in a nitrogen atmosphere furnace, the gel is reaction-sintered to form the desired oxynitride and to densify the material. Because the AlN is already present in the calcined gel, the heating schedule for reaction-sintering can be more rapid, and a crucible arrangement permitting nitrogen flow through the gel particles is not necessary. A nitrogen atmosphere in the furnace is required, however, to avoid oxidation of the AlN and minimize dissociation of the AlN at higher temperatures. A suitable heating schedule was:

```
room temperature → 1000° C.    about 15 min.
         1000 → 1900° C.        about 25° C./min.
                1900° C.         hold for 2 hours
              cool furnace       about 1.5 hours
```

Titanium nitride powder as well as other Group IVB metal nitride powders can also be added to the alumina sol to incorporate these materials into the final product. The AlN and any other Group IVB metal nitride powders added to the sol should have an average particle size below 5 micrometers, preferably less than 1 micrometer.

The composite particles may be used as loose grain or flakes, or used to make coated abrasive products e.g., discs, belts, grinding wheels, nonwoven abrasive products and other products where abrasive granules or particles are typically employed. While particularly useful as abrasive particles, the materials described could also be useful in other articles requiring hardness and wear-resistance, for example, milling media.

The abrasive articles of the invention can be used to grind or polish any grindable surface, such as metal, ceramic, plastic. The abrasive article is moved in contact with the grindable surface for a time and utilizing a pressure sufficient to alter the grindable surface to the degree desired.

Objects and advantages of this invention are further illustrated by the following examples, but the particular materials and amounts thereof recited in these examples, as well as other conditions and details, should not be construed to unduly limit the invention.

EXAMPLE 1

Abrasive particles with a target composition of 50 vol percent $Al_2O_3$, 50 vol percent ALON were prepared as follows:

Step 1

An alumina, AlO(OH), sol was made using 100 grams of Dispersible Alumina TM, (Chattem Chemicals, 1715 W. 38th St., Chattanooga, Tenn.), 406.6 grams of distilled water and 4.536 grams of concentrated $HNO_3$ (70 percent). The distilled water was heated to 80° C. while stirring at a moderate speed using a Premier Dispersator TM (Premier Mill Corporation, 1071 Ave. of the Americas, New York, N.Y. 10018). The Chattem powder was slowly added to the water and allowed to stir for 5 minutes at 80° C. until all the powder had been added. The $HNO_3$ was added very slowly to avoid any foaming. After all the $HNO_3$ had been added the sol was stirred for 15 minutes holding the temperature at 80° C. The sol was transferred to a bottle and the top covered with a Pyrex TM petri-dish. The sol was heat-treated at 90° C. for 24 hours. After heat-treating, the sol was allowed to cool to room temperature and the bottle was capped.

Step 2

300 grams of the alumina sol prepared in Step 1 was weighed into a size 00 - Rolex TM milling jar (Norton Co., One New Bond St., Worcester, Mass. 01606) already containing 1000 grams of 0.64 cm × 0.64 cm (¼ in. × ¼ in.) Burundum TM alpha-alumina grinding media (Norton Co.). The sol was milled for 20 hours at a milling speed of 60 RPM. After milling, the sol was poured into a polyethylene bottle and the contents were stirred with a magnetic stirrer to avoid any milling contaminants from settling out.

Step 3

A 4 weight-percent carbon sol was then prepared using 12.0 grams of Monarch TM 1300 carbon black (Cabot Corporation, 800 Roosevelt Blvd., Glen Ellyn, Ill.) and 288.0 grams of the Chattem sol.

Both ingredients were weighed into a size 00 - Rolex jar already containing 1600 grams of 0.64 cm × 0.64 cm (¼ in. × ¼ in.) $ZrO_2$ grinding media (Corning Glass Works, Houghton Park, Corning, N.Y. 14830). The 4 weight-percent sol was allowed to mill for 48 hours at a milling speed of 60 RPM.

Step 4

Below is the formulation used to prepare the gelling composition. This formulation will produce 100 grams of calcined gel.
55.0 g—4 weight-percent carbon sol (from Step 3)
163.7 g—milled Chattem sol (from Step 2)
438.2 g—Chattem sol (from Step 1)
5.0 g—glycerol
26.2 g—25 weight percent aluminum nitrate solution in water All ingredients were mixed, except the aluminum nitrate solution using an electric stirrer, just fast enough to stir the entire batch. The mix was stirred for 15 minutes and then the gelling agent (aluminum nitrate solution) was slowly added. When all of the gelling agent had been added, the entire batch was stirred for 5 minutes.

Step 5

The sol was poured into a large Pyrex TM tray where it gelled within 15 min. The gell was allowed to dry at room temperature for 24 hours.

Step 6

The gel was further dried in a circulating air oven for 24 hours at 90° C. After oven-drying, the dried gel was lightly crushed using a mortar and pestle and then seived to (25 to 40) mesh, U.S. Standard Sieve Series.

Step 7

The dried gel (25 to 40 mesh) was calcined in a mullite tube furnace under flowing $N_2$ atm. (1900 liters/min) using the following time/temperature conditions.

| | |
|---|---|
| room temp. → 1000° C. | (about 100° C./hr) |
| 1000° C. | (1 hr) |
| 1000° C. → room temp. | about (100° C./hr) |

Step 8

The calcined gel was then reaction sintered in a graphite element resistance furnace (Astro TM Series 1000, Astro Furnace Co., 606 Olive St., Santa Barbara, Calif. 93101) under the following sintering schedule:

| | | |
|---|---|---|
| room temp. → | 1000° C. | (about 15 min) |
| 1000° C. → | 1400° C. | (about 200° C./hr) |
| 1400° C. → | 1880° C. | (about 25° C./min) |
| 1880° C. | | (2 hr) |

Reaction sintering was done in a BN (flow-thru) crucible with flowing $N_2$ (1180 cc/min).

Step 9

The reaction-sintered material was then seived to approximately a Grade 50 specification for grinding tests. Grade 50 material consists of 1:1 by weight mixture of (40 to 45) mesh and (45 to 50) mesh material.

The reaction-sintered grit was dark gray in color. Optical microscopy and X-ray diffraction showed a two-phase microstructure consisting of alpha-alumina and ALON. The grain size was in the range of 2 to 4 micrometers and the grit appeared fully dense. The density of the grit, determined by an Archimedes technique (i.e. first weighing a quantity of abrasive grit and then determining the volume of alcohol displaced when the grain is immersed in the alcohol), was 3.82 g/cm$^3$, which was 99.5 percent of the expected density for a composite composed of 50 volume percent alumina and 50 volume percent aluminum oxynitride.

EXAMPLE 2

Abrasive particles with a target composition of 25 vol percent TiN, 37.5 vol percent $Al_2O_3$, 37.5 vol percent ALON were prepared following the procedures of Example 1 with these exceptions.

Step 3

A 2.8 weight-percent carbon sol was prepared using the following formulation:
8.4 g—carbon black (Monarch 1300)
57.3 g—$Al_2O_3$ milled Chattem sol (Step 2)
172.0 g—Chattem sol (Step 1)
20.8 g—$TiO_2$ (Degussa P-25 TM, Degussa Corp., P.O. Box 2004, Teterboro, N.J. 07608)
41.5 g—distilled water (pH 3.5)

All ingredients were weighed into a size 00 - Norton Rolex jar already containing 1600 grams of 0.64 cm×0.64 cm ($\frac{1}{4}$ in.×$\frac{1}{4}$ in.) $ZrO_2$ grinding media. The formulation was allowed to mill for 48 hours at a milling speed of 60 RPM.

Step 4

Below is the formulation used to prepare the gel. This formulation will produce 62.0 grams of calcined gel.
300.0 g—2.8 weight-percent carbon sol
3.1 g—glycerol
9.2 g—25 weight percent aluminum nitrate soln. in water All ingredients, except the aluminum nitrate solution, were mixed using an electric stirrer rotating just fast enough to stir the entire batch. The formulation was allowed to stir for 15 minutes and then the gelling agent (aluminum nitrate solution) was slowly added. When all of the gelling agent had been added the entire batch was allowed to stir for 5 minutes. When mechanical mixing was stopped, the mix started to gel within seconds. Stiring was continued by hand for 5 minutes to completely break-up any $TiO_2$ flocks that may have been present in the mix.

Step 6

The procedure was the same as in Example 1 except the dry-gel was seived to (20 to 35) mesh.

Step 8

The calcined gel was then reaction-sintered in an Astro furnace under the following conditions:

| | | |
|---|---|---|
| room temp. → | 1000° C. | (about 15 min) |
| 1000° C. → | 1400° C. | (about 200° C./hr) |
| 1400° C. | | (5 hours) |
| 1400° C. → | 1900° C. | (about 25° C./min) |
| 1900° C. | | (2 hours) |

Reaction sintering was done in a BN (flow-thru) crucible with flowing $N_2$ (1180 cc/min.).

The reaction-sintered grit was yellow-brown in color as fired, but showed a metallic gold luster when sectioned and polished. Optical microscopy and x-ray diffraction showed the expected phases: TiN, alpha-alumina, and ALON. The TiN was uniformly distributed throughout the material. All of the phases present had a grain size of 2 micrometers or less. The density of the grit was 4.08 g/cm$^3$ which was 96.2 percent of the expected density for a composite composed of 25 volume percent TiN, 37.5 volume percent alumina, and 37.5 volume percent ALON. The material appeared fully dense, however, when polished sections were viewed at a magnification of 450x.

EXAMPLE 3

Abrasive particles with a target composition of 50 volume percent alumina and 50 volume percent ALON were prepared following the procedures of Examples 1 with these exceptions.

Step 2

Fifty grams of AlN powder (Hermann C. Starck Berlin-Neiderlassing-Laufenburg, West Germany) was weighed into a size 00 - Norton Rolex jar already containing 1000 grams of ¼"×¼" Burundum grinding media. Enough acetone was added to just cover the grinding media. This was milled for 20 hours at a milling speed of 60 RPM.

Step 3

After milling, the AlN powder/acetone slurry was poured into a large Pyrex tray. The tray was placed in an exhaust fume hood for 3 hours to allow the acetone to evaporate. Final drying was done in a circulating-air oven for 4 hours at 50° C. (120° F.).

Step 4

Below is the formulation used to prepare the gelling composition.
612.0 g—Chattem sol (Step 1)
12.1 g—milled AlN powder
24.5 g—25 weight percent aluminum nitrate solution in water The 12.1 grams of milled AlN powder was weighed into a 4 oz. glass bottle (no grinding media used) with 50 grams of acetone and placed on a jar mill for 2 hours to completely break-up the AlN powder. (The milled AlN powder when dry has a tendency to agglomerate into small, very hard lumps). The AlN/acetone slurry was then added to the Chattem sol and stirred slowly using a Premier Dispersator for 15 minutes. The gelling agent (aluminum nitrate solution) was then added very slowly. The mix was allowed to stir at a moderate speed for 5 minutes after all the gelling agent had been added.

Step 6

Same as in Example 1 except the dry-gel was not crushed and seived.

Step 8

The calcined gel was then reaction sintered in an Astro furnace under the following sintering schedule:

| room temp. → | 1000° C. | (about 15 min.) |
| 1000° C. → | 1900° C. | (25° C./min) |
| | 1900° C. | (2 hr) |

Reaction sintering was done in a BN in a nitrogen atmosphere.

The reaction-sintered grit was gray in color. Optical microscopy and X-ray diffraction showed a microstructure similar to that described in Example 1, but with a coarser grain size of 4–8 micrometers. Polished sections of the grit appeared fully dense when viewed at a magnification of 450x. The measured density was 3.87 g/cm$^3$ which was 101 percent of the density expected for a composite of 50 volume percent alumina and 50 volume percent aluminum oxynitride. This suggests the composite was somewhat richer in the higher density alumina phase than expected from the original formulation.

EXAMPLE 4

The abrasive grit of Examples 1 and 3 and a comparative conventional abrasive grit were used to make 17.75 cm (7-inch) diameter coated abrasive discs. The abrasive grit for each disc consisted of 1:1 by weight mixture of 40–45 mesh (average diameter 390 micrometers) and 45–50 mesh (average diameter 330 micrometers) screen cuts obtained using U.S. Standard Screens. The discs were prepared using conventional coated abrasive making procedures, conventional 0.76 mm vulcanized fiber backings and conventional calcium carbonate-filled phenolic resin make (52 weight percent $CaCO_3$ and 48 weight percent phenol-formaldehyde resin) and size (68 weight percent $CaCO_3$ and 32 weight percent phenol-formaldehyde resin) resins without adjusting for mineral density differences. The make resin was precured for 75 minutes at 80° C. The size resin was precured for 90 minutes at 88° C. followed by a final cure at 100° C. for 10 hours. Conventional one-trip coating techniques and curing in a forced air oven were employed. The coating weights (wet basis) were as follows:

| Coating | Coating weight (g/cm$^2$) |
| --- | --- |
| make resin | .017 |
| size resin | .0283 |
| mineral | .0513 |

The resultant cured discs were first conventionally flexed to controllably crack the hard bonding resin. The discs were mounted on a beveled aluminum back-up pad and used to grind the face of a 1.25 cm×18 cm. Type 1018 cold rolled steel workpiece. The disc was driven at 5000 rpm while the portion of the disc overlying the beveled edge of the back-up pad contacted the workpiece at a pressure of 0.91 kg/cm$^2$, it generated a disc wear path of about 140 cm$^2$. Each disc was used to grind 12 separate workpieces for 1 minute each. The relative cumulative cut of the 12 cuts for each disc is shown in TABLE I. The cumulative cut of a disc made using conventional brown fused alumina abrasive is also shown for comparison.

TABLE I

| Grinding Results on Type 1018 Steel | | |
| --- | --- | --- |
| Sample | Composition | Total Cut |
| Comparative 1 | Fused $Al_2O_3$ control | 268 g |
| | 50 vol. percent $Al_2O_3$, 50 vol. percent ALON | 742 g |
| 2 | 25 vol. percent TiN, 37.5 vol. percent $Al_2O_3$, 37.5 vol. percent ALON | 798 g |

The data of TABLE I show that the coated abrasive discs of the invention were much more effective (200 to 300 percent more effective) than a conventional brown fused alumina abrasive disc.

Various modifications and alterations of this invention will become apparent to those skilled in the art without departing from the scope and spirit of this invention, and it should be understood that this invention is not to be unduly limited to the illustrative embodiments set forth herein.

We claim:

1. A coated ceramic abrasive product for grinding steel comprising a backing and having coated on at least one surface thereof a composition comprising a bonding resin and ceramic abrasive particles consisting essentially of a uniform multiphase composite consisting essentially of alumina and gamma-aluminum oxynitride.

2. The coated ceramic abrasive product according to claim 1 wherein said particles consist essentially of 15 to 85 volume percent gamma-aluminum oxynitride and 85 to 15 volume percent alumina.

3. The coated ceramic abrasive product according to claim 1 wherein said ceramic abrasive particles consist essentially of 50 volume percent alumina and 50 volume percent gamma-aluminum oxynitride.

4. A coated ceramic abrasive product for grinding steel comprising a backing and having coated on at least one surface thereof a composition comprising a bonding resin and ceramic abrasive particles consisting essentially of a uniform multiphase composite consisting essentially of alumina, aluminum oxynitride, and titanium nitride.

5. A coated abrasive product according to claim 4 wherein said particles consist essentially of 1 to 85 volume percent alumina, 15, to 85 volume percent gamma-aluminum oxynitride, and 15 to 35 volume percent TiN.

6. The coated ceramic abrasive product according to claim 4 wherein said ceramic abrasive particles consist essentially of 37.5 volume percent alumina, 37.5 percent aluminum oxynitride, and 25 volume percent titanium nitride.

7. A method of grinding a steel comprising the step of:

moving, in contact with each other, a steel surface and a ceramic abrasive article for a time sufficient to alter the grindable surface, said ceramic abrasive article comprising a uniform multiphase mixture of microcrystalline components, said components consists essentially of:

1 to 95 volume percent aluminum oxide, 1 to 95 volume percent gamma-aluminum oxynitride, and 0 to 50 volume percent of at least one of a Periodic Group IVB metal nitrides.

* * * * *

UNITED STATES PATENT AND TRADEMARK OFFICE
CERTIFICATE OF CORRECTION

PATENT NO. : 4,855,264
DATED : August 8, 1989
INVENTOR(S) : James P. Mathers et al.

It is certified that error appears in the above-identified patent and that said Letters Patent is hereby corrected as shown below:

Col. 5, line 63, "68" should read -- 68 --.

Col. 8, line 33, kindly delete "15".

Col. 13, line 49, after "BN" kindly insert
-- crucible --.

Col. 16, line 8, "a steel surface" should read
-- a grindable steel surface --.

Signed and Sealed this

Fifth Day of January, 1993

Attest:

DOUGLAS B. COMER

Attesting Officer

Acting Commissioner of Patents and Trademarks